Figure 1:
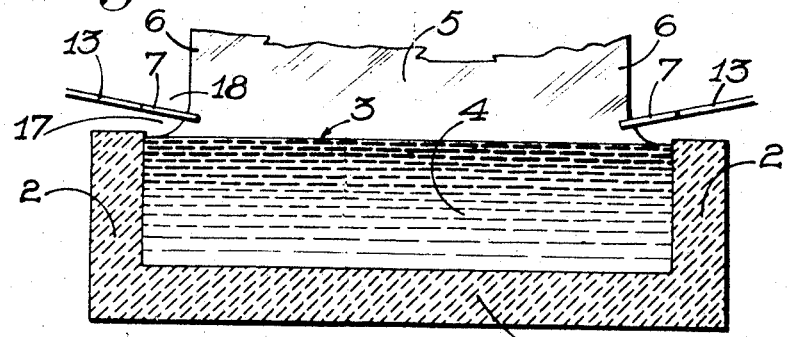

Nov. 7, 1967

A. BROMAN ET AL  3,351,448

PROCESSES AND APPARATUS FOR THE MANUFACTURE
OF SHEETS OF GLASS BY DRAWING

Filed June 22, 1964

INVENTORS
ARTHUR BROMAN
RAYMOND BATS
BY Corey, Hart + Stemple
ATTORNEYS

United States Patent Office 3,351,448
Patented Nov. 7, 1967

3,351,448
PROCESSES AND APPARATUS FOR THE MANUFACTURE OF SHEETS OF GLASS BY DRAWING
Arthur Broman and Raymond Bats, Marcinelle, Belgium, assignors to Glaverbel, Brussels, Belgium
Filed June 22, 1964, Ser. No. 376,838
Claims priority, application Luxembourg, June 29, 1963, 43,977
2 Claims. (Cl. 65—91)

This invention relates to the manufacture of sheets of glass by drawing, and in particular to improvements in processes and apparatus for the manufacture of sheets of glass by drawing from molten glass, in which cooling of the edges of the sheet of glass is controlled.

Often, in the known drawing processes, everything contributes to cooling the edges of the sheet more intensively than the central portion; the molten glass is cooler in the marginal zones of the kiln from which the sheet is drawn; the edges of the sheet are generally formed by means of fixed or movable elements and/or rollers, pulleys or discs which induce a greater or lesser degree of cooling of the edges; moreover, the edges rise in those regions of the drawing chamber which are coolest and they are exposed to the influence of currents of fresh air which enter through orifices in the ends of the drawing chamber which cannot be entirely closed.

In several known technical processes this supplementary cooling of the edges is reduced by a limitation of the calorific losses by controlling the cold currents and reheating the bath of molten glass near the points of formation of the edges and the ends of the drawing chamber. However, this limitation of the cooling of the edges is generally insufficient, and moreover if the temperature gradient across the width of the sheet were completely removed, great difficulty would be experienced in drawing owing to the lack of rigidity of the edges.

Excess cooling of the edges is very troublesome for it induces forces of compression in the edges, accompanied by corresponding tensile forces in the neighbouring marginal region. These forces render unusable the band of glass which contains them. Apart from the production loss, the cutting of the edges is rendered difficult because the strip chips, and, once detached, the sheet breaks diagonally at the region of the corners.

It has also been proposed to anneal the edges but there is the danger of putting them in tension, which would lead to breaking of the sheet.

It is a main object of the present invention to eliminate all these disadvantages and to offer in addition various advantages.

According to the invention there is provided a process for the manufacture of a sheet of glass by drawing from molten glass, in which cooling of the edges of the sheet is regulated with relation to neighbouring regions of the sheet, characterised in that compensation is made for excess cooling at the edges of the sheet by using as a reserve of heat bulbs of glass formed in the edges of the sheet.

The bulbs of glass formed in the edges of the sheet are not set by cooling, as in many prior processes, by the cooling agents cited above or by means of elements cooled by circulation of fluid and arranged in contact with or near to the edges of the sheet, but on the contrary they are largely protected as far as possible against any vigorous cooling. The excess cooling which exists brings about a progressive setting of the superficial layer of glass on the bulb which contributes very usefully to increasing the strength of the edge, also facilitating the drawing by stabilising the edge, reducing the viscous flow, and maintaining the sheet itself. However, the intensity of cooling being limited, the core of the bulb maintains a high temperature by reason of the low thermal conductivity of the glass and constitutes a reserve of heat to moderate the cooling of the superficial layers and retard their solidification and the possibility of being put into tension. The dimensions of the bulb are determined in such a way that its average temperature remains approximately equal to that of the sheet proper but the disadvantage stated in the case of preventing the transverse temperature gradient is avoided, owing to the rigidity given to the edge by the setting of the superficial layers. As the edge and the margin have temperatures very near to each other, the tensions which come into existence on cooling are small and extend over a reduced width. The result is a reduction of the edge loss, that is to say an increase in production and a reduction in cutting difficulties.

Preferably each edge has a bulb form produced by passing the edge through a slot in a forming element, the width of the slot being greater near the bottom than near its opening. The slotted forming element is advantageously placed at a short distance from the free surface of the molten glass in such a way that the glass which reaches it is still very hot, adheres strongly to the walls of the slot, and assumes its form. Also, the bulb is thicker at a short distance from the extremity than farther away and it continues to thin out beyond the forming element until it attains the normal thickness of the sheet of glass. The result is that the width of the margin is reduced, that is to say that the thickness of the sheet within the admissible limits of tolerance is attained at a shorter distance from the edge than is known processes.

Advantageously a hot zone below the forming element is separated in the neighbourhood of each edge from a cooler zone above the element. The forming element is preferably a plate which is much longer than the slot and also forms a screen which has the triple advantage of considerably reducing the access of the cold currents of gas descending towards the forming meniscus of the bulb under the plate, of protecting the bulb immediately above the plate against radiation from the bath of molten glass, favouring also setting of the superficial layer from the time that the bulb is formed, as well as being heated by this radiation from the molten glass, in such a way as to limit cooling of the core of the bulb and to achieve good adhesion of the bulb to the walls of the slot.

The invention also comprehends apparatus for the manufacture of glass by drawing comprising for each edge of the sheet a forming element provided with a slot for forming an edge of the sheet, which elements are located a short distance away from the surface of the molten glass, characterised in that the slot in each forming element is wider near the bottom than near its opening. This apparatus includes only static elements and is remarkably simple with regard to the great advantages which it provides in combination with the limitation of the excess cooling of the edges in the drawing kiln. It can also be combined with additional means for maintaining the edges, such as rollers, discs or pulleys.

Preferably, the slotted forming element is a plate which is substantially flat and slightly inclined towards the middle of the sheet. In this way the bulb is forced into the bottom of the slot and thus it is possible to avoid more surely any contraction of the sheet of glass.

Figure 2:
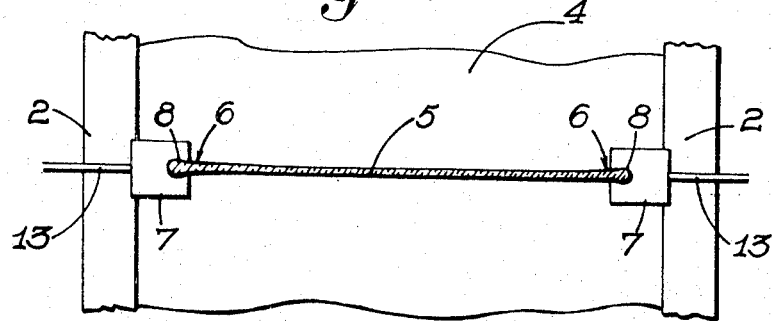
Figure 3:
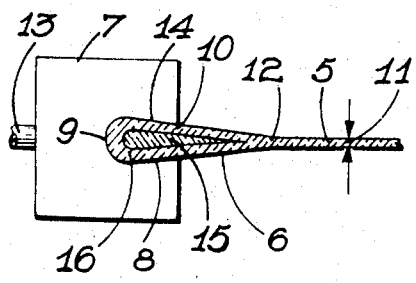
Figure 4:
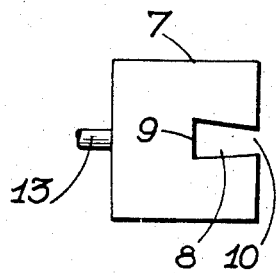

In order that the invention may be more clearly understood some embodiments thereof will now be described, by way of example, with reference to the accompanying drawings in which:

FIG. 1 is a transverse vertical section of a drawing kiln and glass bath, with edge forming elements according to the invention, FIG. 2 is a plan view of the same apparatus, FIG. 3 shows on a larger scale a detail of this plan view, and FIG. 4 is a variant of the forming element according to the invention.

Referring to the drawings a drawing kiln consists of a bottom 1 and lateral walls 2, and a sheet of glass 5 is drawn from the surface 3 of the molten glass 4. Those parts of the apparatus which are not necessary to the description, such as drawing rollers, etc., are not shown. The edges 6 of the sheet 5 are formed by means of two plates 7, each provided with a slot 8 whose width at the proximity of the bottom 9 of the slot is greater than near its entrance 10 (FIGS. 3 and 4). As the width of the slot at the opening 10 is however greater than the thickness 11 of the sheet of glass, the edge continues to taper until it reaches this thickness at the point 12. The plates 7 are held by brackets 13 in a position inclined downwardly towards the middle of the sheet 5 by means of known controlling devices, not shown, which permit adjustment of the height and lateral position of the plates as well as their inclination. The bottom of the slot can be curved as shown in FIGURES 2 and 3 or rectilinear as shown in FIGURE 4.

The plates form bulbs 14 in the edges of the glass, and the core 15 of each bulb 14 constitutes a reserve of heat available to slow down cooling of the superficial layers 16, in such a way as to reduce the temperature gradient between the edge 6 and the sheet 5 and, consequently to reduce the strains in the glass. In addition, the plates 7 act as screens separating the zone 17 from the cooler zone 18 (FIG. 1).

This edge forming arrangement can be used in all known installations for drawing sheets of glass, and the invention also comprehends flat glass produced by the method of the invention and sheets of glass cut therefrom.

We claim:

1. The process of reducing the tensions in the edges of a sheet of glass which is drawn upwardly from a bath of molten glass, which consists in producing along each of such edges at a place located in adjacently spaced relation above the upper surface of the glass bath, a bulb of glass having its greatest cross-sectional dimension spaced outwardly from the body of the glass sheet and being of a size to constitute a reserve for heat in sufficent degree to moderate the cooling thereof above such place, and simultaneously at the place of formation of such bulb utilizing part of the heat radiated from the portion of the bath from which such edge is drawn to effect the formation of such bulb, reflecting part of such radiant heat back over the portion of such edge between such place and the bath and to such bath portion, and impeding the downward flow of cold gases past such place, whereby the glass in such edge is maintained heated to said place of formation and its solidification beyond such place is retarded to the extent that the creation of tensions in the glass in such edge are diminished.

2. In combination with apparatus for drawing a sheet of glass upwardly from a bath of molten glass in a container therefor, of means for reducing the tensions in each edge of such sheet of glass comprising a plate located in adjacently spaced relation above the upper surface of the glass bath, said plate being disposed transversely to the plane of the glass sheet with one surface thereof in opposed relation to such upper bath surface and extending across the path of movement of such edge to enable it to absorb into such exposed surface and to reflect back over the portion of such edge between such plate and the upper bath surface, radiant heat from the portion of the bath from which such edge of the sheet is drawn, and to impede the downward flow of cold gases along such edge toward such bath surface, said plate having at its inner end a slot for receiving such edge of the glass sheet, the radiant heat heated edges of said slot being shaped to distort the glass in such edge into a bulb of glass having its greatest cross-sectional dimension spaced outwardly from the body of the glass sheet and of a size rendering it capable of reserving sufficient heat to retard the cooling of the glass in such edge above such plate to the extent that the creation of tensions in the glass in such edge are diminished.

References Cited

UNITED STATES PATENTS

| | | | |
|---|---|---|---|
| 1,681,258 | 8/1928 | Rowley | 65—199 XR |
| 1,761,219 | 6/1930 | Mambourg | 65—91 |
| 1,883,734 | 10/1932 | Halback | 65—199 XR |

DONALL H. SYLVESTER, *Primary Examiner.*

S. LEON BASHORE, *Examiner.*

F. W. MIGA, *Assistant Examiner.*